F. P. E. CARRIE.

Manufacture of Ice.

No. 30,201.

Patented Oct. 2, 1860.

Witnesses:

Inventor:
F. P. E. Carré by
A. Pollak, his atty.

F. P. E. CARRIE.

Manufacture of Ice.

No. 30,201.

Patented Oct. 2, 1860.

F. P. E. CARRIE.
Manufacture of Ice.

No. 30,201.

Patented Oct. 2, 1860.

Witnesses:

Inventor:

F. P. E. CARRIE.

Manufacture of Ice.

No. 30,201.

Patented Oct. 2, 1860.

Witnesses:

Inventor:

UNITED STATES PATENT OFFICE.

F. P. E. CARRÉ, OF PARIS, FRANCE.

IMPROVEMENT IN APPARATUS FOR FREEZING LIQUIDS.

Specification forming part of Letters Patent No. 30,201, dated October 2, 1860.

*To all whom it may concern:*

Be it known that I, FERDINAND PHILIP EDWARD CARRÉ, of Paris, France, have invented certain Improvements in Means for Producing Cold or Making Ice; and I declare that the following is a full and exact description thereof, reference being had to the accompanying drawings, and to the letters of reference marked thereon.

The fact that by vaporization an enormous quantity of caloric is absorbed has led to the use of the vaporization of volatile fluids in the vacuum to produce cold artificially and to make ice. Liquids—such as ether, sulphuret of carbon, &c.—that reach the boiling-point at a low temperature, and the vapor of which possesses (even at the temperature of freezing water) a considerable degree of tension, (5.5118 to 6.9055 inches of mercury) are eminently suitable to produce this result. For instance, if a recipient surrounded with water containing ether be put in communication with the exhaust-pipe of an air-pump, or if this pump be caused first to produce the vacuum in the recipient, when the said recipient is cleared of air, or nearly so, the ether will vaporize by virtue of its tension. We know that at 24.8° Fahrenheit it possesses a tension of about 6.9055 inches of mercury. Now at this temperature water freezes, and for that very reason the vaporization of a liquid cannot be effected without the absorption of a certain amount of caloric. Thus ether will absorb from the water surrounding the sides of the recipient its latent caloric, which (water) after having yielded all its latent caloric will be found converted into ice. If, on the other hand, the vapors of ether be forced into a worm, which we shall suppose thoroughly free from air and surrounded with cold water constantly renewed, so that it may be maintained at a uniform temperature of about 57.2° Fahrenheit, we find that at this temperature the tension of the vapor of ether to be about 12.5984 inches of mercury, or that as soon as, in consequence of the working of the pump, the vapors accumulated into the worm acquire a tension little beyond 12.5984 inches of mercury they will be condensed thereby, yielding their latent caloric of elasticity to the surrounding mass of water. Again, if the condensed ether in the worm be as soon as formed returned to the freezer, the latter will work continuously. In order that this series of phenomena may be produced in a constant and perfect manner, and allow of economy both as regards the motive power and the preservation of the liquids used, whose price is always comparatively high, it is necessary to make use of apparatus in which the vacuum once made is preserved indefinitely, or nearly so. Indeed, if air having a pressure of from 28 to 31 inches on all the openings and joints of the apparatus happen to get in it, it will require part of the motive power, besides checking the condensation, to be used for its own expulsion. By accumulating in the condenser the useful effect of the apparatus may be entirely annihilated, as its expulsion carries away considerable quantities of volatile liquid, and the operation under such conditions proves too onerous to be practicable. I avoid these inconveniences by means of the series of combinations hereafter expounded, whose efficiency has been tested by sufficient experiment, so that many of apparatuses used by me have kept for several months their initial or primitive vacuum, and consequently without losing an atom of ether. The special dispositions and arrangements of receivers, &c., I have found most efficient for the purpose of collecting the cold produced as well as for applying it are hereinafter fully explained.

The first sheet contains a drawing of the whole apparatus and several views necessary to make thoroughly comprehensive the application of the above-stated principles to an apparatus working by means of an ordinary air-pump.

Figure 1:
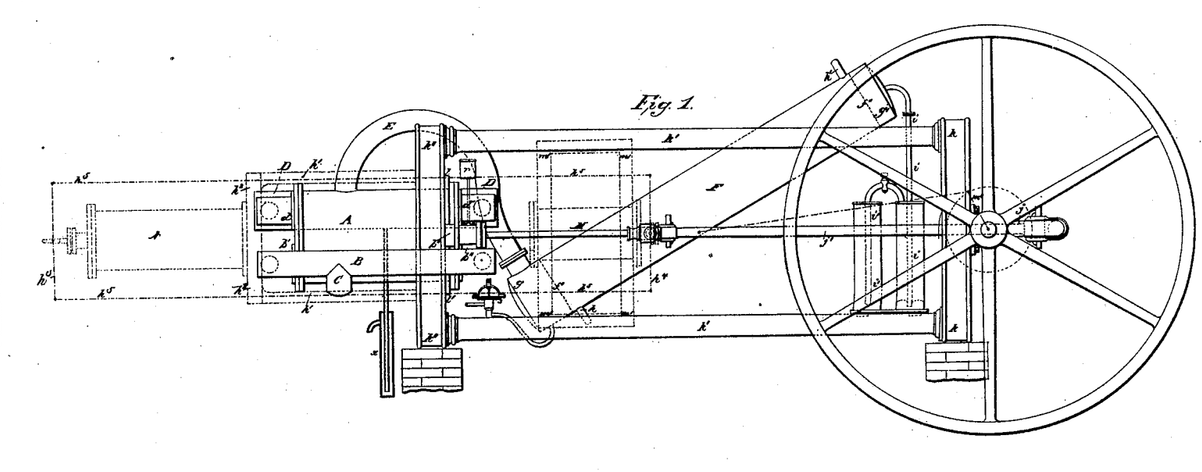

In Figure 1, A is a double-acting air-pump; B, bifurcated tube, fixed by means of the branch tubes $b\ b'$ upon the openings of the exhaust-valves; C, tube communicating with the freezer. D is a large bifurcated tube, whose branch tubes $d\ d'$ are fitted on the openings of the forcing-valves; E, tube leading the vapors to the condenser; F, tubular condenser composed of small tubes soldered at their ends in the caps or partition on either end of the condenser, and composed of two plates, $f\ f'$, that are soldered on their periphery to the interior of the large tube inclosing the whole, thus forming two distinct subdivisions, one composed of the two chambers G G', communicating with each other by means of the small tubes, the other formed by the spaces left between each tube and the part of the casing included between the two plates $f f'$. The vapor to be condensed is allowed to enter the chamber G and the interior of the tubes while the cold water is around them, or vice versa. $h h'$ are small tubes arranged for the circulation of the cold water. Opposite to the entrance of the vapors into the condenser is fitted a barometric column, $i$, made of iron or aluminium. It is used as outlet. $i'$, washer containing oil, through which air is caused to pass, to divest itself of the vapors of ether mixed with it; J, crank-shaft; J', crank connecting the piston-rod to the shaft. The frame consists of a case, K'', four columns, K', and a second case made similar to the first one. There are also braces above and below the cylinder of the pump, which is bolted to them through the ears $l, l'$, and $l''$, the latter receiving likewise the sliding columns used as guides to the piston-rod. $r$, reservoir supplying a circular recess formed in the stuffing-box around the piston-rod, with liquid to prevent air from getting into it; $s$, cock, with elastic and metallic partition, to be used for regulating the return of condensed ether from the condenser to the refrigerator; T, fly-wheel, which may be arranged to carry the belt to transmit motive power.

Figure 2:
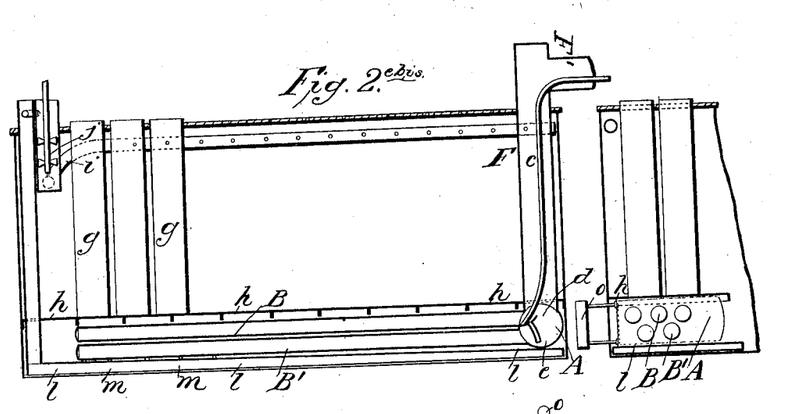
Figure 2E:
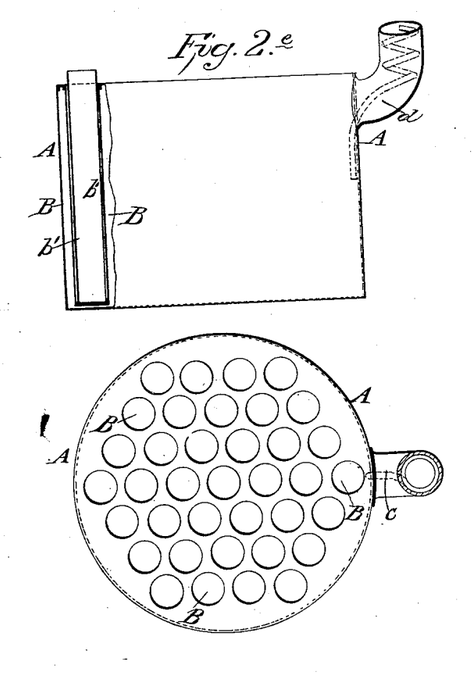

Fig. 2 is the refrigerator or freezer containing the volatile liquid, the water to be frozen, and connected with the suction-pipe of the pump; A, hermetically-closed metallic tank; B, cylinders closed at the base, open at the top, soldered on the upper bottom of the tank, and receiving either directly the water to be cooled or frozen or, preferably, cylindrical movable vessels $b'$ that are brought into contact with the inner sides of the cylinders B by means of a liquid freezing only at a very low temperature, such as alcohol, either pure or mixed with water, solution of chloride of calcium, or several other salts. These movable vessels facilitate the removal of the ice. When the operation is ended, it is only necessary to dip them in water at 50° or 59° Fahrenheit, in order that the layer of ice adherent to the vase may be melted, and thus allow of the removal of the ice. C', exhaust-pipe; $d$, tube returning the ether from the condenser. The ether ought to rise in the recipient to a height of from 4.7245 to 5.9056 inches from its top.

Fig. 2$^{bis}$ represents a freezer proper, made of tubes arranged in the bottom of a rectangular vat, and in which cold is imparted to the objects to be frozen. On the large collecting-pipe A are arranged two or three horizontal rows of tubes, B B', receiving the volatile liquid, which, continually arriving from the condenser through the little pipe C', flows at first into the trough $d$, that extends along the whole length of the collector A and conveys it to the row of tubes B at a height, which is limited by the overflow-pipe $c$, the surplus of the said liquid flowing through the said pipe into the bottom of the collector A, from which it is again carried to the row of tubes B'. An exhaust-pipe, F F', leads to the pump. The vases G, containing the water to be frozen, are arranged vertically above tubes B B'. Cold is imparted to them by means of an uncongealable liquid, such as the one above referred to, that circulates upward. This circulation is effected by the lateral suction-tubes $i$, acting at the upper part of the bath through holes made in their whole length, and this suction being effected by means of a pump, or preferably by means of a screw, J. The liquid raised by the screw flows through the pipe K, leading it into a flat pipe, $l$, that extends over the whole bottom of the vat, from which pipe $l$ it reascends through the small holes disseminated on the upper face of the flat pipe and on lines coinciding with the axes of the tubes of the inferior row. In lieu of the two rows of pipes B B' may be substituted a simple row, occupying nearly the same place as the row B'. The trough $d$ is suppressed, being of no use. In order to get a larger surface with a single row, the tubes may be made oval-shaped or flattened. In this case the greater sectional axis should be vertical. It is preferable that the vases G be supported on the cover of the vat, in the holes of which they may rest by means of a lap at their top; but in case it is desired to use bottles or vessels of any other form arranged to rest on the bottom, a grate, $n$, should be provided above the tubes to support them. $o$ is a gage indicating, on the outside, the level of the liquid in the apparatus.

Figure 3E:
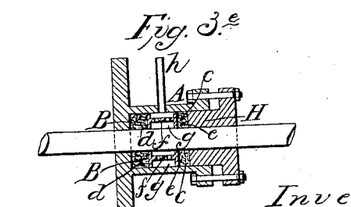

Fig. 3 represents details of the hydraulic stuffing-box, forming the hermetic packing of the pump-rod A, stuffing-box; B, a first packing of hemp, resting on the bottom of the pump; $c$, a second packing arranged at the orifice of the box. $d$ $e$ are two plates, and $f$ a cylindrical ring perforated with holes on the whole of its circumference, leaving between the two packings an annular space, G, communicating through the tube $h$ with a reservoir placed above, that receives a supply of liquid; H, the counter-piece. It will be understood that a liquid such as the oil placed in the upper reservoir will interruptedly fill the annular space G and completely exclude the air from the pump. I may substitute for the hemp packing leather washers, the cylindrical part of which fits the rod, while the flat portion is kept by the plates $d$ $e$ and the ring $f$ close to the bottom of the box on one side and to the counter-piece H on the other. The arrangement shown for this part is specially adapted to a horizontal pump. It may be applied to vertical ones by doing away with the second packing placed near the orifice of the box, which itself becomes the reservoir containing the liquid. In such case the ring $f$ should be prolonged to the outside of the box, where a flat brace-plate is caused to compress the packing. The problem of hermetically packing the piston-rod may also be solved by inclosing it in a barometrical column, A, Fig. 4, soldered onto the lid of the pump, which in such case should be a vertical one. The barometrical column is provided at its lower part with a cup, B, containing mercury of such quantity that under all circumstances it will rise externally above the lower orifice of the barometrical column and internally to a height proportionate to the difference between interior and exterior tensions. The cup is provided on its center and underneath with a stuffing-box, c, to allow passage to the rod and retain the mercury.

Figures 4, 6E:
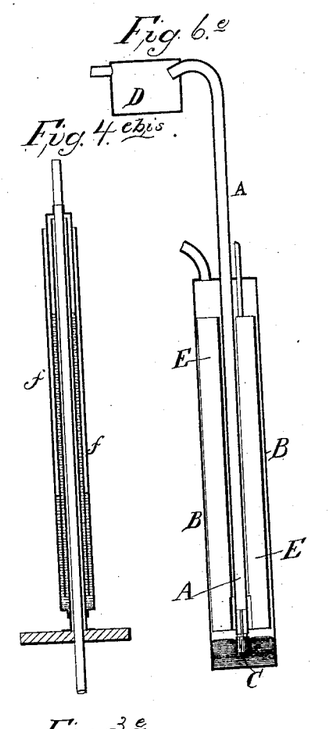
Figure 4E:
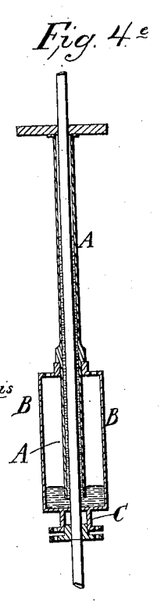

Fig. 4$^{bis}$ is a modification of the same principle. Here the rod and cup are above the pump. The rod passes through the barometrical column, which is hollow. A bell soldered on the top of the rod is reversed on the column and the cup f, and surrounds the whole concentrically. It is worth noticing that these columns must be sufficiently high so that the stroke of the rod may take place without uncovering the bath of mercury. It is even very useful to fix their height above the limits strictly necessary in order to avoid accidental ejections of the mercury into the interior of the pump and recipients.

Figure 5:
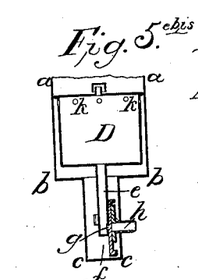
Figure 5E:
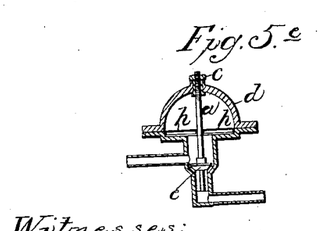

Fig. 5 shows what I call a "vacuum-cock." It is placed on the tube conveying the ether back from the condenser to the freezer, and serves to regulate this return. It is as to its interior construction analogous to valve-cocks. Its operating-rod a passes through a metallic diaphragm, b, which is soldered on its circumference to a bell-mouthed appendage to the cock. The rod is worked from the outside by means of a screw-nut collar, c, in a suitable frame, and actuates the valve e by causing the deflection of the metallic diaphragm, which, evidently, can not give passage to the atmospheric air. The diaphragm b may be corrugated, to obtain a greater deflection.

Fig. 5$^{bis}$ represents an apparatus that I call the "compensator." It may be soldered as an appendage at its upper border, a, to that part of the condenser in which the condensed liquid is deposited. a b c is the casing; D, an open vessel, through which the liquid is caused to pass in order to return to the freezer. e is the central pipe, closed at the bottom, and provided with a flat plate, f, having a hole, G, in it. This plate is arranged to slide upon another with which the tube h is provided. The thickness of the vessel D is calculated to give it a specific weight of about one-half of that of the volatile liquid used. This liquid, filling first the space included between the two vases, causes the vase D to rise, and the two holes of the plate to diverge. When at the height of the holes K, it flows into the vase D until this vessel being sufficiently filled to sink the holes being thus brought opposite each other, the fluid will flow away in proportion to the reconstituted quantity of liquid. This vessel being open, it has no pressure to sustain, and may therefore be constructed as light as necessary without incurring risk of leakage that too often renders hermetric floats unfit for continued use. The outlet requisite for the expulsion of air from the condenser at the beginning of the operation, or, when by accident the air gets in the recipient, is effected by a barometrical column, A, Fig. 6, dipping into a cup, B, containing mercury. When the interior pressure of the condenser is superior to the exterior pressure, the mercury sinks in the column and allows the air to get out. When the cold water around the condenser creates the vacuum, the mercury ascends the column until equilibrium is established between the tensions, and thus excludes the outer air. This part constitutes an outlet always open for egress and always hermetrically closed for ingress. A valve, C, opening from within outward, is fitted to the lower orifice of the column. It is provided with an appendage that makes it to float on the mercury, and pushes it close to the column in such a manner that by sudden exhaustion no mercury could be projected inside the condenser. For greater safety the column may be made to terminate into an enlargement, D, before connecting to the condenser. When the apparatus at rest is exposed to a heat superior to the temperature of the boiling-point of the volatile liquid therein contained, it is necessary to interpose means to prevent the issue of vapors under pressure. This end is easily effected by means of the float E, contained in the cup, and which is dipped more or less into the mercury, either to cause it to bathe the lower part of the column at a height of an inch or so or to cause it to rise around the said column at a height sufficient to counterbalance the internal pressure. For the same purpose the column of the reservoir, Fig. 1, is used that feeds the hydraulic stuffing-box of the piston-rod or the mercury in the cup of the piston-rod, Fig. 4. The disposition of Fig. 4$^{bis}$ remedies this defect. I would here observe that these modifications are material to apparatus that will be set up in countries under tropical climate, or when it is intended to operate with highly volatile liquids, such as chloric ether, or, again, when the operator has at his command for the condensation but water at a temperature a little too high for normal condensation. The liquid of the annular bath around the piston-rod percolating always a little through the packing, settles into the lower part of the large tube D, Fig. 1, which forms the junction of the tube d' d'' of the forcing-valves, and is drawn off from there by means of the instrument x, which is analogous to the manometrical column of the condenser, and terminates at the bottom of this tube, and across which the liquid flows away when the vacuum of the condenser is destroyed. This is easily done by intercepting for the time the circulation of the water of condensation.

Figure 7E:
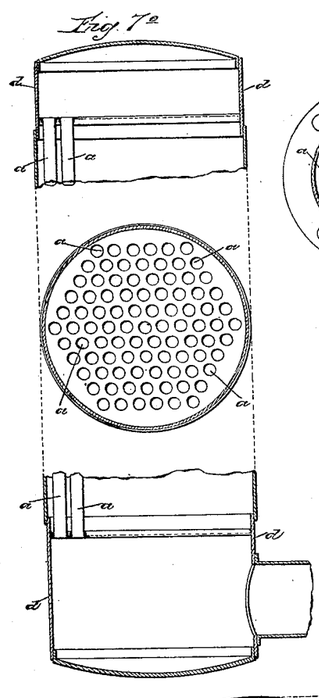

Fig. 7 and 7$^{bis}$ exhibit the mode of constructing the tubular condenser, of which the parts are put together exclusively by means of soldering, and without leaving any possibility of leakage. The tubes $a$ $a$, that compose it, are soldered at their ends around the tubular caps $b$, set into the plates at either end of the series of tubes, and in which the soldering is made with tin on a large surface. The circumference of the plates C is itself bent to be easily soldered onto the casing $d$. I use this kind of joint in tubes set in parts forming flat surfaces, and in every analogous case—for instance, in the tubes of the freezer Fig. 2. The volatile liquid returns from the condenser with considerable temperature. It is beneficial to reduce this temperature to that of the cold of the vapors of the congelator during the passage of the latter to the pump. To this effect the return-pipe $d$ is connected with the exhaust pipe $c$, Fig. 2, in which it may be made to wind about to increase the surface of contact.

In order to be able to accelerate the working of the pump and reduce as much as possible their size, I arrange on each bottom several valves performing the same function.

Figure 8E:
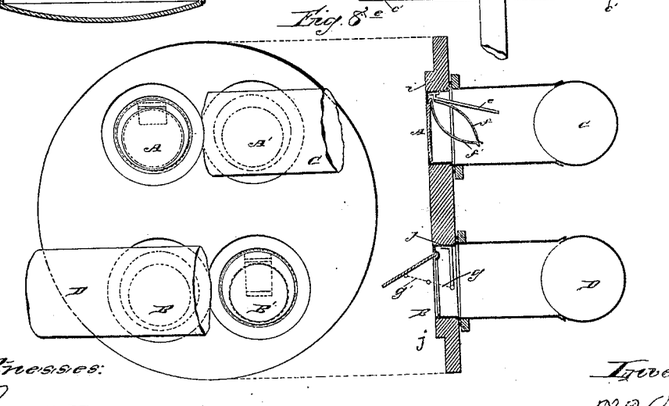

A A in Fig. 8 represent the forcing-valves; B B' the exhaust-valves. They are united upon tubes C D, common to both. The forcing-valves play against a stop, $e$, and are forced back by springs $f f$, one of which is fixed to the stop, while the other is secured to the valve to accelerate their closing down. The exhaust-valves are kept back by articulated rods G G', or such other contrivance that limits their opening. The seats of these valves $i$ $j$ are movable to make their repairing easy. They are provided with a little flange, by which it is imprisoned within the thickness of the bottom plate, and there forms a joint by means of a soft-metal ring, leather, &c. These valves should be as light as possible. The best materials to construct them with are steel and aluminium. The position of the forcing-valves at the top of the bottom plate of horizontal pump allows of the reduction of the waste space left at each stroke of the piston by the use of a slightly volatile liquid placed in the cylinder, and which fills up this space to the height of these valves. This liquid may be the oil that percolates from the annular bath around the piston-rod, or, preferably, glycerine, which may be used in lieu of oil in the bath, or which may be poured from time to time together with oil. Glycerine, having no affinity for ether, will do better than any other liquid when in contact with its vapor. To apply this disposition to vertical cylinders, their bottoms should be so arranged that the forcing-valves $a$ $a'$, Fig. 9, form the summit of a very flattened convex cone on the bottom and concave on the top, the piston being shaped to hug the top and bottom plates. The liquid bath will be constantly maintained and will expel every particle of vapor at the end of each stroke of the piston. Glycerine is the liquid which I prefer for all the apparatus in which I have indicated the use of a liquid to annihilate the waste spaces and when it is brought in contact with the vapor of ether. I use specially for the cylinder of the prime mover Fig. 11, for that of the pump Fig. 1, and even for the common steam-cylinders, a piston represented in Fig. 10. It is hollow, and as light as possible; but in order that its internal capacity shall communicate with the interior a partition is cast with the body of the piston $b$. Small holes are of course left in the partition, to be used as air holes and for the withdrawal of the sand of the core. These are carefully closed with screws sunk in place with a solution of ammoniacal salt. The part subject to friction of this piston is composed of two concentric rings, C C', each being formed by the crossing of two eccentric circles. I use, also, but only in the cold, the piston shown in Fig. 10$^{bis}$, made of two disks hollowed out, with cylindrical flanges $a$ $b$. The disk $a$ is provided with the hub $a'$, in which is set the rod. The disk $b$ is bolted through the rod onto the disk $a$. The packing of this piston is made of two pieces of leather, $c$ $c'$, bent flush with the face of the cylinder. Both pieces of leather are clamped at $d$ by the flanges of the disks $a$ and $b$, so as to form a perfect joint, and a leather washer, $e$, is placed between the shell $a$ and the disk $b$, and prevents all communication from the hollow of the piston to the interior.

I obtain good practical results as regards economy in the construction, arrangement, and effect produced by applying the moving power generated in a steam-cylinder directly to the working of the pumps. I will now indicate three principal modes of realizing these combinations. (See Fig. 1.) The moving cylinder may be placed laterally at M, and may be fixed upon a frame, $m'$, that is bolted sidewise on two columns. The crank-shaft J is put in motion by means of a crank, $m''$, fixed on a prolongation of it without the casing, which may be set back, so that the cylinder M may come nearer to the axis of the two columns. Another plan consists in placing the cylinder upon a line being the prolongation of the axis of the pump at N, by connecting with the main frame four small columns, $n'$, that support a frame, $n''$, on which it is bolted. The moving rod is connected to the pump-rod by means of rails $n^3$ $n^4$, braced by the rods $n^5$, which at the same time may serve as guides; or, again, the cylinder may be placed vertically to the axis of the cylinder of the pump and act directly upon the cross-bar which guides its rod by means of a lever, and which is connected to it by means of articulated rods whose fulcrum rests on an appendage to the columns of the frames; or, finally, the moving cylinder may be arranged slightly deviating from the vertical line last referred to, but have its axis located to point toward the center of the crank-shaft and operate it by means of a special crank. These two combinations being sufficiently comprehensible from the above statement, are not represented in the drawings. In the first case the crank of the prime mover may be wedged onto the shaft at an angle to the crank that moves the pump, so that the greatest power shall be developed and applied at the time of the greatest resistance of the pump. If steam at high pressure and without condensation be substituted for the ordinary low-pressure engine, the size of the steam-cylinder should be from one-sixth to one-tenth of that of the pump, according to the steam being used more or less expansively. With condensation and great expansion it may vary from one-third to one fifth of that of the pump. The cylinder of the prime mover and of the pump may also be arranged on a frame similar to that of horizontal steam-engines, with interior partition, forming two compartments, one for each cylinder.

The operating of the apparatus is as follows: First, begin by expelling the air that is contained in it and remove temporarily from its bath of mercury the barometrical column of the condenser, Fig. 6, by raising the plunger D. Impart then a slow rotary motion to the shaft, and the working of the piston will expel the air, which is readily superseded by the vapor of ether. When the greatest part of air is expelled, which takes place after five or six revolutions of the shaft, let the cold water circulate into the condenser, reimmerse the plunger into the mercury in the cup, and accelerate the pump by degrees until it reaches its normal speed. The expulsion of air is at first incomplete; but after some minutes working it may be completed by shutting off the circulation of cold water in the condenser. The water contained in it, being not renewed, gets warm, its interior tension becomes greater than the atmospheric pressure, and the small amount of air yet inclosed passes away easily through the mercury that bathes the lower part of the barometrical column. These means may be resorted to when from an accidental cause the air has entered the apparatus. The elastic deflection of metals may be of avail to set up pumps, solving in a more radical manner the problem of the absolute hermeticity.

Figures 11, 15, 18:
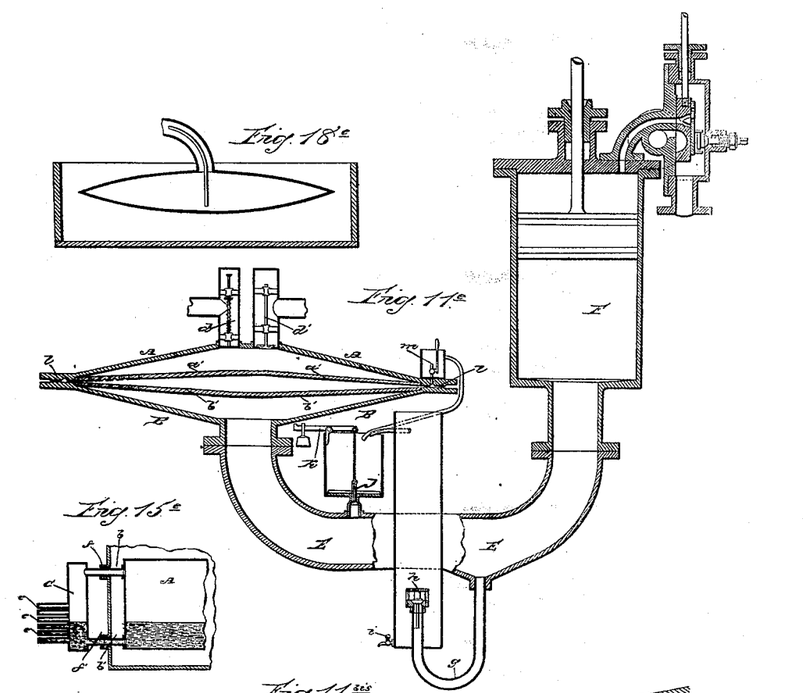

A B, Figs. 11 and 11$^{bis}$, is a double conical vessel, provided in its interior with two double bottoms, $a' b'$, circumscribing a lenticular or double conical space very much flattened, especially toward its circumference, where it approaches the shape of a flat disk. A thin metallic diaphragm, $c$, hugging the shape of the double bottom $a'$, and corrugated concentrically in order to obtain the greatest amount of deflection within the limits of the natural elasticity of the metal, is soldered at its circumference to the flange of the vessel A. If a reciprocating motion is imparted to it, it will perform the functions of a single-acting pump. The vessel A is provided with two valves, one exhausting, $d$, and the other forcing, $d'$, because of its weak action, and in order to avoid the effect of waste spaces, which, in spite of the perfection of the fittings, will occur, and would prove detrimental. The space left between the double bottom $a$ and the inner side of the vessel A is filled with a liquid slightly volatile—such as oil or glycerine—that will come in contact with the valves when the diaphragm is placed against the double bottom $a'$. This bottom is perforated with holes all over its surface to facilitate the motion of the liquid. A similar arrangement is used for the double bottom $b'$. In the center of the vessel B is fitted a large pipe, E, that is bent to connect with a steam-cylinder, F, provided with a piston and all the ordinary accessories of a single-acting and condensating steam-engine, the steam-chest of this cylinder being preferably applied to the top plate of the steam-cylinder. The diaphragm being close against the double bottom $b'$ of the vase B, and the piston of the cylinder being the top of its stroke, the whole intermediate space is filled with a liquid slightly volatile, such as oil. The admission of the steam into the cylinder will cause the piston to ascend, and the diaphragm will be forced back close to the bottom $a'$ of the vessel A'. During the emission of steam into the condenser a contrary effect will be produced, and the reciprocating motion of the piston, whose length of stroke ought to be regulated to form a space equal to that formed between the two double bottoms, will produce an analogous effect upon the diaphragm, thus acting as a regular pump-piston. A siphon, G, is fitted at the inferior part of the tube E to receive the condensed water that should have passed between the cylinder and the piston. As this water would increase the bulk of the liquid, it is removed through the safety-valve $h$, which opens at from three to four inches above the bottom of the reservoir filled with oil up to above the valve. The water, by virtue of its density, will flow into the bottom of the reservoir, from which it may be drawn off through the cock $i$. The siphon may be cooled by a current of water on the outside thereof, in order to lessen the tension of the water on the inside. If chlorhydric ether be used, the valve $h$ should be weighted to resist the pressure at which its condensation takes place. The same precaution should be adopted when sulphuric ether is condensed by means of water at a rather high temperature. The tube E is surmounted by another valve, J, opening from without inward into an oil-reservoir. This valve should be regulated by a lever having movable weight K, so regulated as to counterbalance the valve against the exterior atmospheric pressure during the time the exhaust takes place, and in such a manner as to let the oil return when a deficit in the quantity of oil produces a vacuum greater than necessary for the aspiration at the end of each ascending stroke of the piston.

In order to avoid the sojourning or accumulating of air against the diaphragm on the lower side and toward the vessel B, and to lessen the exhausting power by its elasticity, a groove is cut into the thickness of the flanges of the vessel A and beyond the soldered flanges of the diaphragm. When the latter is applied close to the double bottom $b'$, the groove forms the culminating point of it and the air will occupy it. This groove is provided with a small outlet-pipe, $m$, having at its extremity a cock or faucet opening from within outward. Two may be used, superposed to each other, the object of which is to allow the air to escape. The cock should dip in an oil bath, $m$, to avoid the return of air. This bath is arranged to discharge its surplus by means of an overflow-pipe into the lower reservoir of the valve J. The groove $l$ increases gradually in depth until it reaches the outlet-pipe $m$, so as to carry along the air to be expelled. A slight inclination, however, of the apparatus may produce the same result.

Motion may be imparted to the piston of the cylinder F by any means other than steam—by connecting, for instance, with the driving-shaft through the medium of cog-wheels, &c. When acting under the direct impulsion of steam, the piston should be provided on both of its faces with a coating of some non-conductor body.

It is not strictly necessary that the diaphragm should work on a liquid substance on that part of the vessel A where it acts as a pump, the liquid intervening only as means of perfection of work in relation to the waste space to be avoided; but when it is not used the vessel A assumes the shape of the double bottom $a'$, which may be thus dispensed with, and the diaphragm is made perfectly to fit the side against which it has been pushed back.

The apparatus represented, Fig. 12, is arranged on the same principle as the precedent one. Its shape renders it more particularly suited to receive the action of an exterior moving power. It consists of a very thin metallic cylinder, $a$, deeply corrugated on the whole of its circumference and in the direction of its circumference, being thus susceptible of considerable deflection in the direction of its axis. It is soldered at both ends—i. e., to the upper and stationary disk, $b$, having the valves on it, and to a lower disk, $c$, movable, and having attached to it the motor. The interior of this cylinder contains a liquid such as oil, or, preferably, glycerine, which is made to fill it exactly up to the limit of its inward deflection. The interior drum, $d$, decreases the quantity of liquid to be used. Two such apparatus may be combined on either side of the articulation of a working-beam, so that both are put in motion simultaneously in contrary directions.

Corrugated tubes of a smaller diameter may be applied to put in motion any kind of mechanism in the recipients preserved from the presence of air, such as valves, slides, levers—for instance, the obturation-valve of the cock, Fig. 5, &c.—and also to move the piston-rod of an ordinary pump of short stroke and large diameter.

Figures 11, 13:
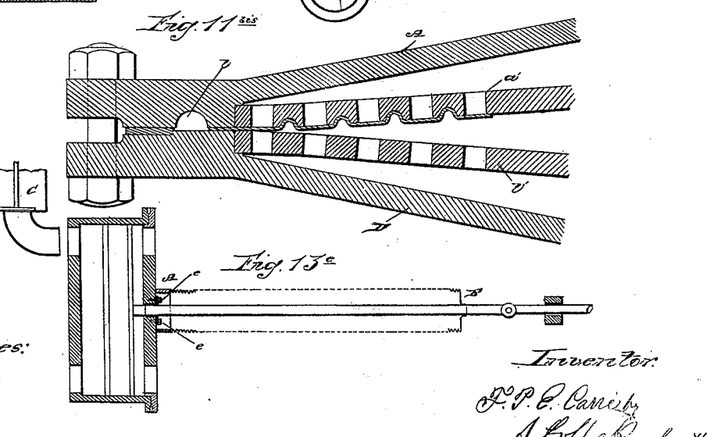

Fig. 13 shows such an arrangement. The tube is soldered onto one end on the center of the lid A, and on the other end onto the top of the rod B, sufficiently prolonged for that purpose. The horizontal position would suit better this kind of pump. Its forcing-valves should be placed at the top of its bottom plate similarly to those described, Fig. 8, or to that shown in $c$. A sufficient quantity of glycerine laid on each side of the piston fills up the little waste space left between it and the bottoms at the end of each stroke. A piece of bent leather, $e$, bolted against the hole allows passage to the rod, but prevents the chamber from acting as waste space. The set of mechanism whose parts are moved by metallic flexion ought to admit of soldering on all the joints, such as those of the bottom of the cylinders, valves, pipes, conduits, &c.

Figures 9, 10, 14, 19:
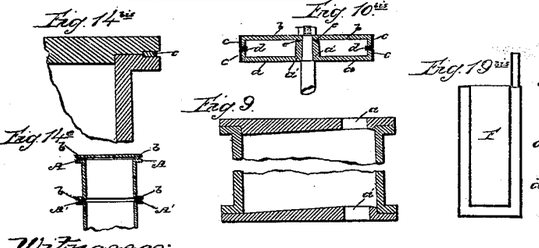
Figure 10E:
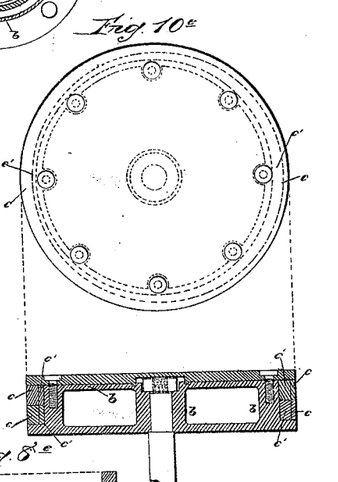

The joints in the several parts constituting the condenser may be made tight, having regard for repeated dismounting of apparatus, in the following manner: In Fig. 14, A A′ represent a joint which may be readily dismounted, a ring, $b$, of lead or other similar substance is interposed between the flanges, and the whole is soldered together. This mode is applicable to all kinds of joints, even for steam-cylinder; but in the latter case the joint should be previously tinned. To avoid further compression of the interposed metal, I provide annular recesses in either of the flanges and lodge the soft metal in said recesses, as shown, Fig. 14, at $c$.

The level of the volatile liquid in the freezer is ascertained by inspection of the indicator. (Shown in Figs. 2 and $2^{bis}$.) In said instrument A is part of the refrigerator or freezer; $b$ and $b'$, tubes establishing communication between the freezer and the indicator, respectively, at the vapor space and the liquid space; $e\ e$, series of tubes filled either with vapor or liquid, according to the height in the freezer of the liquid. $f\ f$ are projecting cylindrical tubes with which the packing of the tubes $b\ b'$ is effected.

Figures 16, 16E:
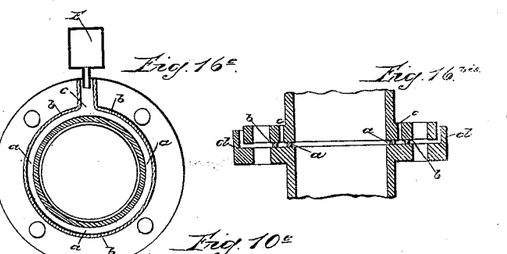

To render the joints permanently hermetic against the outer air, I use the device shown in Figs. 16 and $16^{bis}$, the former representing an adaptation to horizontal cylinders, the latter to vertical cylinders. $a$ is the space which is to be packed. I cast around it an annular recipient, $b$, terminating at its upper end with an upright orifice. The space $a$ is now filled with a liquid substance, which is retained by the formation of the recipient $b$. By previously filling the vessel E and reversing it, as shown in the figure, vertical cylinders, I form the recipient on the one side of the bolt by making the lower flange with an upright border, $d$, and on the other side by making a series of holes, $c$, in the upper flange, and by inserting the metallic packing $a$ and $b$ at either side of the holes $c$.

Fig. 17 is a refrigerator specially constructed to be used for the crystallization of salts contained in certain liquids—for instance, those containing sulphate of soda formed by precipitation from sea-water. It is a well-known fact that under the influence of cold of but few degrees below zero the sulphate of magnesia contained in said liquid reacts upon the chloride of sodium and produces a sulphate of soda, in which form it is precipitated. This apparatus consists of a series of tubes, A, closed at their bottom and secured at their top to an exhaust-chamber, B, communicating by means of tubular column C with an air-pump. The pipe $d$ constantly feeds the apparatus with the evaporating liquid, so that the tubes are always full. The whole is set into a vat, E, having a funnel-shaped bottom for the easier discharge of solid contents. This apparatus may be made to work continuously for this purpose. The feed-pipe F conveys the mother-liquor to the vat, which, coming in contact with the tubes, is freed from its containing salt. The contact is increased by the use of stirrers $h$, revolving on a central spindle, $i$. The salt is precipitated, falls to the bottom, whence it is carried off by chain-bucket K and discharged. The liquid thus freed of its salt is specifically lighter. It will therefore rise in the tub and be discharged at $l$.

The artificial freezing of liquids may be applied to the distillation of sea-water. This is based upon the fact that water containing salts or other foreign substances has the property of eliminating them by freezing the water slowly. This may be effected in a more efficient manner by causing the congelation to proceed upward, commencing from below.

Fig. 18 shows an apparatus constructed to operate on this principle. A lenticular float is filled with the evaporating liquid, and is always in contact with the water to be frozen in the tub. Several vats may be used in which flat basins A A′, containing the volatile liquid, are caused to be supernatant. These several basins are connected together by pipes establishing circulation between said basins of the liquid. (See Fig. 18$^{bis}$.) These apparatus may also be used for the concentration by congelation of vinegars, acetic acid, alcohol, sirups, &c.; also, for the separation by congelation from essential oils—such as paraffine, stearine, &c.—of divers foreign substances contained in them by way of solution. When it is desirable to produce intense cold, chlorhydric ether should be used.

Either of the apparatus shown in Figs. 2$^{b}$ and 17 may be used to cool liquids or air by causing the same to circulate more or less rapidly, according to the degree of cold to be imparted. The ingress and egress of liquid or air for this circulation ought to take place at opposite extremities. In using the apparatus Fig. 2$^{bis}$ for cooling air it is necessary to confine the channel of circulation to the space containing the refrigeratory tubes. The air may be driven into this channel by means of a blower, and may be directed from there through conduits similar to those of the hot-air furnaces in use for apartments, hospitals, theaters, &c. An apparatus similar to the condenser, Fig. 7, may also be used for the same purpose. It will be more advisable when so applied to effect the vaporization in the chamber formed around the tubes and to appropriate the interior of the tubes for the circulation of air or water. The air-refrigerators should present surfaces of contact much larger than those used for liquids. This enlargement of surface may be dispensed with or avoided by forcing the air through a hollow column, from the top of which cold water falls like a shower by passing through a plate pierced with small holes.

It is scarcely necessary to point out that all the recipients exposed to refrigeration should be protected against the heating by radiation and contact of ambient air by means of coatings of bodies being bad conductors of caloric. Their outer sides of stationary parts should receive this coating permanently, and movable covers should be used to facilitate the removal of the products. The cylinders of ice are raised from the several apparatus at a temperature ranging from 50° to 59° Fahrenheit. From the movable vessels they are removed after their superficial layer is melted away. I avail myself of this reheating in the following manner: I introduce them into the cells of an apparatus similar to that shown, Fig. 2, but containing, instead of volatile liquid, the water to be used for the following operation, and which, during the change of its temperature to that of the ice, is found to be brought to about zero. The cells of this apparatus should also contain a liquid of contact interposed between sides and the cylinders to be thawed. The water to be cooled should be kept agitated. Certain substances having the property when cold to absorb considerable quantities of gases or vapors, and to yield them again when heated, especially in the vacuum, I make use of this property for the production of cold and of ice. The chloride of silver, for instance, absorbs when cold considerable quantities of ammoniacal gas. Now, if in its state of saturation it be confined in the closed branch of a tube bent in the shape of a U turned upside down, if the air be cleared by warming the said end very slightly, and then the other branch welded, and, again, if the first branch be heated while keeping the second in a bath of cold water, about at 104° or 122° Fahrenheit, it will be found that almost the whole of ammoniacal gases will have left the chloride of silver, and will be condensed or liquefied in the second branch. If, then, this latter branch *b* be placed in a cylindrical vessel of a very small capacity containing water, and at the same time the first branch be kept in a bath of cold water, the absorptive property of the chloride of silver will quickly vaporize the liquefied ammoniac. The latter drawing off its latent caloric of vaporization from the water surrounding the second branch, will freeze in part. It will prove beneficial to make the horizontal part of the tube smaller in size and elongated enough to avoid the reheating owing to the conductability. The chloride of calcium, dried at about 392° Fahrenheit, and water, the sulphuric acid monohydrate and water, a solution saturated with ammoniac and water, concentrated hydrate of potash or soda may be operated upon in a similar manner. Care should be taken that the requisite degree of heat be used, according to the mixture used to volatilize the liquid or gas of the solution. With the chloride of calcium and water the heat ought to reach from 374° to 392°; with sulphuric acid and water, from 572° to 590°; with a solution of ammoniacal gas in water, 302°; with hydrate of potash or soda, 302° to 392°.

Figures 17C, 18, 20, 20A, 20C:
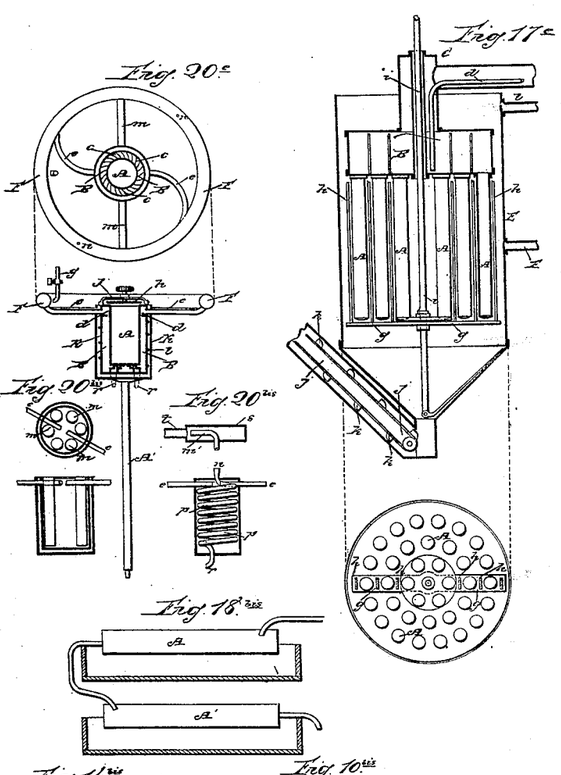

It is easy to apply the principle just before stated to the manufacture of ice by means of the simple apparatus shown in Fig. 19, which may be used in every household. M is the recipient, containing the absorptive body arranged in layers in the interior reservoirs, *b*, which are disks forming one body with the recipient, and having in the middle an opening with flange. Their multiplicity affords considerable surface, and therefore greater rapidity of absorption necessary for the congelation. *c* is the recipient into which the gases or vapors flow to be liquefied. These settle in conical reservoirs *d*, forming one body with the recipient *c*. E is the connecting-pipe of the two recipients. It may be provided with the kind of cock described under Fig. 5, used for checking at pleasure the absorptive action. To use this apparatus, the reservoir A is to be heated to the proper temperature either in a furnace or in a bath containing water or other substance conveying the said requisite temperature to the reservoir. The recipient *c* is maintained in a water constantly cooled. When the vaporization is complete, the reservoir A is surrounded with a current of cold water, and the absorption will commence and an intense cold created, which is imparted to water for the purpose of freezing it by dipping into it the recipient *c*. When a solution is used of which the volatile principle is water, it is necessary to add substances that cause the lowering of its freezing-point without destroying its volatility. If these substances be salts, it is good to select such as dissolve in water without forming with it any combinations, at least at no less a temperature than 50°—such as, for instance, the sea-salts, the azotate of potash, &c. A little quantity of alcohol may also be introduced—say the fifth or sixth of the water to be condensed. This apparatus should be absolutely air and water tight in all its parts, which is obtained by means of soldering rather than riveting. The interior should not be liable to be acted upon by the divers agents used. It should be silvered or coated with platina for the ammoniacal chloride of silver, coated with platina for sulphuric acid and water, and silvered for hydrates of potassium and sodium. Iron, copper, and tin may resist chloride of calcium. Iron and tin thoroughly resist the aqueous solution of ammoniac. With the latter solution the ascensional tube of the reservoir A should be increased in diameter and height to allow of the condensation of the aqueous vapors carried away with those of the ammonia. The recipients may be made of iron or enameled copper, except for the potassium and sodium. They may be constructed in any suitable shape. To obtain the best result, however, the recipient *c* should be an annular vessel (see Fig. 19$^{bis}$) forming ice in the internal cylinder, F, or else it may be constructed like the congelator, Fig. 2. The energy of projection of the centrifugal force at great velocity may give rise to a curious application of this force to the production of cold, and even to the formation of ice. The apparatus I intend to make use of to produce this result is represented in Fig. 20. Two vertical concentric reservoirs, A B, are arranged above vertical shaft A', to which a very rapid rotatory motion is imparted. The reservoir A contains water to be cooled or congealed. The recipient B incloses a volatile liquid the vapor of which is very dense, its boiling-point being rather low—for instance, sulphuric ether, chlorhydric ether, sulphuric acid, sulphurate of carbon, &c. As the effect by the rotation will be to separate from the recipient A the liquid contained in the recipient B by throwing it against the outer sides of the latter, numerous vertical partitions, C', soldered on A and coming in contact with B, will convey to the former the cold produced. An annular partition soldered on B at some distance from its top, and leaving a void space of about one-tenth of an inch around the recipient A, will prevent the liquid from being projected, and will allow free discharge to the vapors. These will communicate through two tubes, C, opening at the top of the recipient B, and above the annular partition *d* with the circular tube F, in which their condensation will be effected under the action of projection generated by the rotation. The cooling of the tube F will be produced by a small stream of water showering against its internal face through a tube, G. The circular tube F may be coated with a tissue to avoid the violence of the dash of water and to activate condensation, on account of its porosity, which assists vaporization. The vase A should be closed tightly with a lid, h, by means of the interposition of a sheet of caoutchouc, leather, &c. This lid is fastened onto the vase by means of central screws working in a movable brace, j. The set of the two vessels A and B are sealed into a metallic casing by means of a body that is a bad conductor—such as plaster. The casing is secured to the vertical shaft ll. The flanges on the outside of the recipient B are provided for the purpose of strengthening the joints. m are braces radiating from the casing K and uniting onto the circular tube F.

Fig. 20$^{bis}$ is a modification of the interior arrangement of the refrigeratory vessel. In this the ice is produced in cells m, arranged as close as possible to the circumference of the vessel. The tubes of centrifugal exhaust terminate near the center, in order not to carry away any of the volatile liquid that in consequence of the rotation leaves a central vacuum. The cells should be closed in like manner as in the vase A of Fig. 20.

Fig. 20$^{ter}$ exhibits an apparatus intended to cool the liquids and air by continuous circulation, except the stoppage necessary to convey back the volatile liquid. The helical tube n p r crosses the refrigerator at the top, and on the center of which it is arranged funnel-like, n, through which may be introduced the liquid, which by virtue of the centrifugal force will be forced out through the outlet r. It may be received in a circular trough concentric with the circle described by r. This apparatus used for cooling air may at the same time be used as ventilator. It will be found advantageous to draw air through the inferior part of the tube, and to expel it through the superior one by lengthening and bending sufficiently the tube m' to obtain a centrifugal effect. The bent tube should be connected with a flat drum, S, from which starts the conductor-tube T.

This apparatus is constructed absolutely tight. All the couplings, joints of tubes are made by soldering, with sufficient crossing of parts to insure solidity. It should be carefully cleared of air after the introduction of the volatile liquid, which can be easily obtained by raising it to the boiling-point and allowing for a few minutes the disengagement of the vapor through two little holes, m, opposite the tubes e, and by soldering during the ebullition itself. Cold is transmitted to the bottom of the vessel A by means of little reservoirs r, soldered on the bottom of the recipient B.

The transport to tropical countries of the volatile liquids that are used in supplying the congelatory apparatus should be made in metallic tanks cylindrical in shape, with bottoms convex or conical to resist the pressure, and closed by soldering. They may be previously purged of air by ebullition.

Experience has thought best to use the following proportions in the different parts of apparatus when operating with sulphuric ether: A pump, generating an amount of twenty-two gallons per second, provided with a congelator and a condenser of at least 16.40 square feet of surface of contact. The surface of valves and the section of exhaust and forcing pipes should be of 23.62 square inch, with chlorhydric ether. The surfaces of the congelator and condenser should be increased by nearly half, regard being had to the amount (nearly double) of caloric contained in the same volume of its vapor at the same temperature.

Having thus described my invention, I claim—

The general arrangement of apparatus herein described for producing cold in manufacturing ice by chemical agents.

In testimony whereof I have signed my name to this specification before two subscribing witnesses.

F. CARRÉ.

Witnesses:
E. MUNARD,
GEO. HUTTON.